United States Patent
Knippel et al.

(10) Patent No.: US 6,839,822 B2
(45) Date of Patent: Jan. 4, 2005

(54) MEMORY-BLOCK COALESCING BASED ON RUN-TIME DEMAND MONITORING

(75) Inventors: Ross C. Knippel, Half Moon Bay, CA (US); Steven K. Heller, Acton, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 421 days.

(21) Appl. No.: 10/055,414

(22) Filed: Oct. 29, 2001

(65) Prior Publication Data

US 2003/0084263 A1 May 1, 2003

(51) Int. Cl.[7] .......................... G06F 12/00; G06F 13/00
(52) U.S. Cl. ...................................... 711/170; 707/205
(58) Field of Search ............................... 711/170, 171, 711/173, 220; 707/205, 206

(56) References Cited

U.S. PATENT DOCUMENTS 5,978,893 A * 11/1999 Bakshi et al. ............... 711/171
6,490,670 B1 * 12/2002 Collins et al. .............. 711/173

OTHER PUBLICATIONS

Paul R. Wilson et al., Dynamic Storage Allocation: A Survey and Critical Review, Department of Computer Science, University of Texas at Austin, USA. pp. 1–78.

B. H. Margolin et al., Analysis of Free–Storage Algorithms, Free–Storage Algorithms, No. 4, pp. 283–304, 1971.

Dirk Grunwald et al., CustoMalloc: Efficient Synthesized Memory Allocators, Department of Computer Science, University of Colorado at Boulder, Technical Report CU–CS–602–92, pp. 1–22, 1992.

* cited by examiner

Primary Examiner—Pierre M. Vital
(74) Attorney, Agent, or Firm—Foley Hoag LLP

(57) ABSTRACT

A computer system (10) implements a memory allocator that employs a data structure (FIG. 3) to maintain an inventory of dynamically allocated memory available to receive new data. It receives from one or more programs requests that it allocate memory from a dynamically allocable memory "heap." It responds to such requests by performing the requested allocation and removing the thus-allocated memory block from the inventory. Conversely, it adds to the inventory memory blocks that the supported program or programs request be freed. In the process, it monitors the frequencies with which memory blocks of different sizes are allocated, and it projects from those frequencies future demand for different-sized memory blocks. When it needs to coalesce multiple smaller blocks to fulfil an actual or expected request for a larger block, it bases its selection of which constituent blocks to coalesce on whether enough free blocks of a constituent block's size exist to meet the projected demand for them.

49 Claims, 3 Drawing Sheets

MEMORY-BLOCK COALESCING BASED ON RUN-TIME DEMAND MONITORING

BACKGROUND OF THE INVENTION

1. Field of the Invention

The present invention concerns computer-memory allocators and in particular mechanisms that they employ for coalescing memory blocks.

2. Background Information

Some of the instructions that a processor reads from its memory direct it to read data stored in other memory locations. The program as loaded often specifies the locations in which the data are to be stored: memory is allocated statically. But many programs generate large quantities of intermediate results that require only temporary storage. To use memory efficiently, memory should not be allocated to such results unless and until they are actually produced: it should be allocated dynamically. And, once the program no longer needs the data for which space was thus allocated, the program should be allowed to reuse that memory space.

For this reason, most large programs employ a "heap" of dynamically allocable memory. As the program proceeds, various previously free memory blocks within the heap contain needed data, while other memory blocks become free for reuse because they contain data that are no longer needed. To keep track, the computer system usually maintains an inventory of the locations and sizes of "free" memory blocks, i.e., of memory blocks that can receive new results.

Now, computer programs typically deal with data as various-sized "objects," each of which typically has all of its data stored in contiguous memory locations. So a block of (contiguous) memory locations must be found when the time comes to allocate memory dynamically to an object. An allocator is the system component that handles the task of keeping track of such free memory blocks and determining which of the free memory blocks are to be used to store new data.

Allocators occur at various levels in the software hierarchy. An operating system itself generates data for which it must dynamically allocate memory, so one of an operating system's tasks is to act as an allocator for that purpose. The operating system typically also serves as an allocator in response to various system calls made by applications programs. The C library function malloc( ), for instance, is a system call that an application uses to ask the system to allocate memory to the application. The free( ) library function conversely tells the system that the calling process no longer needs the data contained by the memory block that the call identifies.

Additionally, some applications that have called upon the operating system to allocate them memory will in turn act as allocators in "sub-allocating" that memory. An example of such an application is the Java Virtual Machine ("JVM"). (Java is a trademark or registered trademark of Sun Microsystems, Inc., in the United States and other countries.) Such an application calls upon the operating system to allocate it memory for its private heap, which it sub-allocates to objects created by the virtual-machine- language programs that it executes. The input to the JVM is one or more "class files," which include virtual-machine programs, i.e., sequences of the virtual machine's instructions. Included in the virtual machine's instruction set are instructions for allocating new objects, and the virtual machine can so operate as to allocate object memory by removing objects from the free-block inventory. The JVM not only executes the class file's explicit instructions but also performs automatic "garbage collection": it identifies objects that the virtual-machine program will no longer use. The JVM may add such objects' memory space to the free-block inventory after they are thus identified.

Independently of the software-hierarchy level at which an allocator operates, two functions that it must perform are "splitting" and "coalescing." When a program frees a memory block of a relatively large size, the allocator may initially place it in its free-block inventory as a single block. If a program thereafter requests allocation of a smaller block and no block of the requested size is available, the allocator may split that block into smaller blocks. Conversely, the allocator may have several relatively small contiguous blocks in its inventory, and it may coalesce those blocks into a single composite block. (Workers in this field treat coalesce as a transitive verb.).

Now, many programs have certain phases of operation in which coalescing is significantly less expensive than it is at other times. In the case of a program that periodically performs mark-sweep garbage collection, for instance, memory blocks that are contiguous are identified most readily during the phase in which the program sweeps, i.e., identifies no-longer-needed memory space. It is valuable in some cases to perform coalescing in connection with the sweep operation rather than wait until the need to allocate space for a large object actually arises. Such preemptive coalescing is therefore practiced widely.

But preemptive coalescing can also be counterproductive. If a lot of contiguous blocks are identified and coalesced, the number of smaller blocks may later prove to be inadequate, and blocks resulting from coalescing may simply have to be split again. So some coalescing can prove to be unnecessary and detract from program performance.

To reduce such unnecessary coalescing and splitting, it has been proposed that the allocator use an adaptive policy, one that limits the volume of uncoalesced blocks and adapts the supplies of various-sized blocks to the program's recent usage pattern. Specifically, it has been proposed that memory blocks of selected sizes be put on "quick lists," whose blocks are not subject to coalescing, but that the quick lists be flushed periodically into the general free-block population, where coalescing is permitted.

SUMMARY OF THE INVENTION

We have developed an approach that tends to match coalescing more accurately to the need for it. We derive a demand indicator for each of a plurality of memory-block size ranges. We do this by monitoring run-time allocations of memory blocks whose sizes fall within the respective ranges. When a run of contiguous free memory blocks is a candidate for coalescing into a larger block, we employ such a demand indicator in deciding whether the coalescing should actually be performed. One can use such demand indicators, for instance, by basing the decision on one of the run's constituent memory blocks. The coalescing decision can be made by comparing the number of free blocks within the size range to which that block belongs with some function of the demand indicator associated with that range.

By thus basing the decision on an actual run-time demand measurement, one can make the amount of coalescing performed tend to follow run-time variations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
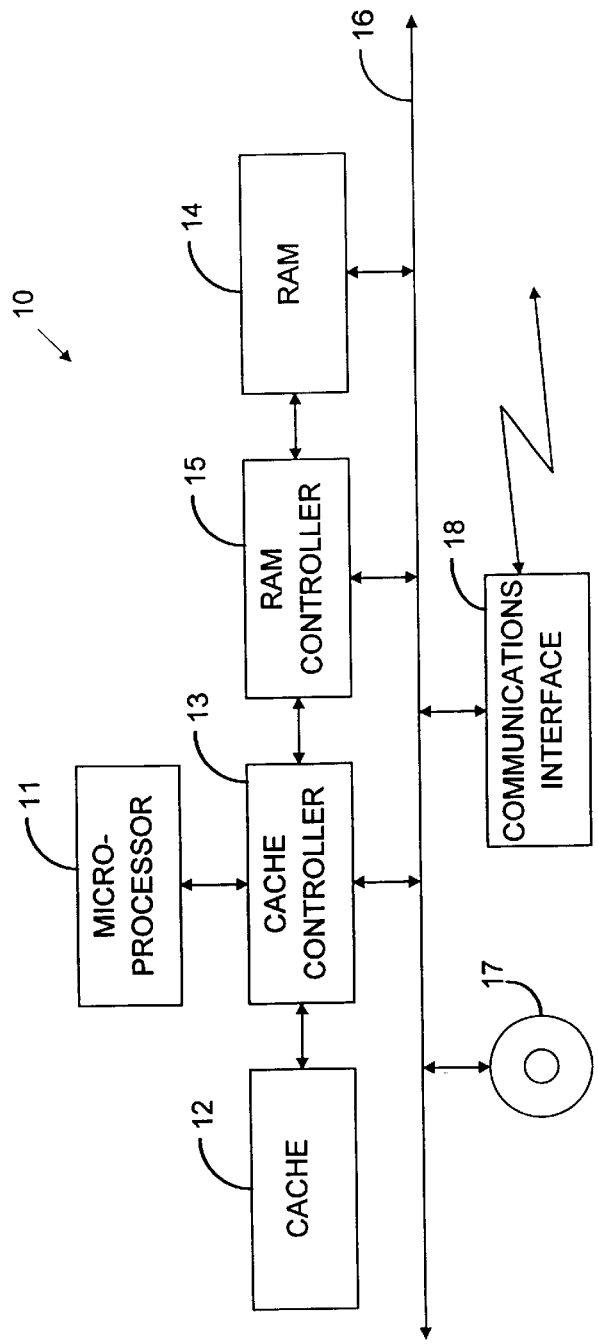
FIG. 1 is a block diagram of one type of computer system in which the present invention's teachings can be practiced.

The demand-based coalescing to which the present invention is directed can be implemented in essentially all types of computer systems, but FIG. 1 depicts one type of computer system for the sake of concreteness. It is a uniprocessor system 10 that employs a single microprocessor 11. In FIG. 1's exemplary system, microprocessor 11 receives data and instructions for operating on them from on-board cache memory or further cache memory 12, possibly through the mediation of a cache controller 13. The cache controller 13 can in turn receive such data from system read/write memory ("RAM") 14 through a RAM controller 15 or from various peripheral devices through a system bus 16.

The RAM 14's data and instruction contents, which can configure the system to implement the teachings to be described below, will ordinarily have been loaded from peripheral devices such as a system disk 17. Other sources include communications interface 18, which can receive instructions and data from other computer equipment.

It will be mentioned below that some of the allocator's operations may be performed in the "background," typically in an execution thread separate from the thread or threads that carry out a program's more-central operations. Such parallel execution threads can be run on a uniprocessor, but some of the benefits of multi-threaded operation are more manifest in multiprocessor computer systems.

Figure 2:
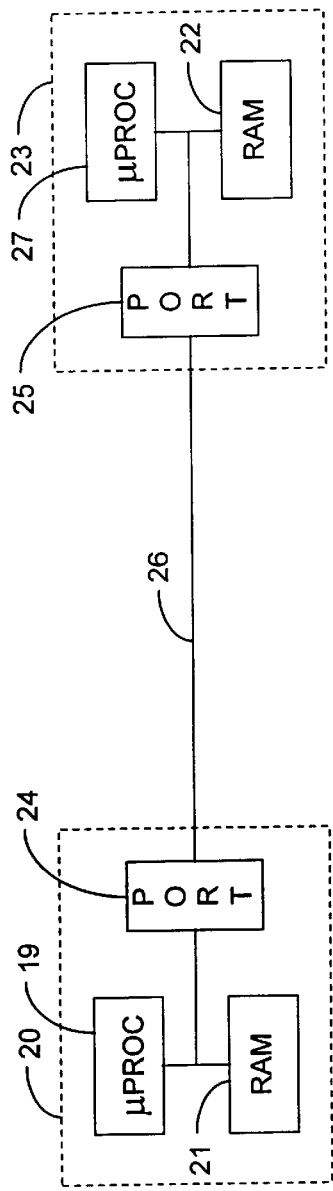
FIG. 2 is a block diagram of another type of computer system in which the present invention's teachings can be practiced.

Some multiprocessors may be largely the same as that of FIG. 1 with the exception that they include several microprocessors such as processor 11, possibly together with respective cache memories, sharing common read/write memory by communication over the common bus 16. In other configurations, parts of the shared memory may be more local to one or more processors than to others. In FIG. 2, for instance, one or more microprocessors 19 at a location 20 may have access both to a local memory module 21 and to a further, remote memory module 22, which is provided at a remote location 23. Because of the greater distance, though, port circuitry 24 and 25 may be necessary to communicate at the lower speed to which an intervening channel 26 is limited. A processor 27 at the remote location may similarly have different-speed access to both memory modules 21 and 22. In such a situation, one or the other or both of the processors may need to fetch code or data or both from a remote location, but it will often be true that parts of the code will be replicated in both places. Regardless of the configuration, different processors can operate on the same code, although that code may be replicated in different physical memory, so different processors can be used to execute different threads of the same process.

The computer systems of FIGS. 1 and 2 are but two of the many types of computer systems in which the present invention's teachings may be implemented. Regardless of its particular type, a computer system is configured to implement an allocator by computer code typically stored on a persistent machine-readable medium, such as FIG. 1's system disk 17, and the code is loaded into RAM 15 for that purpose by electrical-signal transmission. But the code's persistent storage may instead be provided in a server system remote from the machine or machines that implement the allocator. The electrical signals that carry the digital data by which the computer systems exchange the code are exemplary forms of carrier waves transporting the information.

A computer system that employs the present invention's teachings will keep a "heap" of memory from which blocks can be allocated dynamically, and the allocator will in some fashion keep track of those blocks. One way to do so is simply to employ a linked list, typically in size or address order, of the blocks that are free for allocation; since the blocks are free, their contents can include pointers to subsequent blocks in the list.

Figure 3:
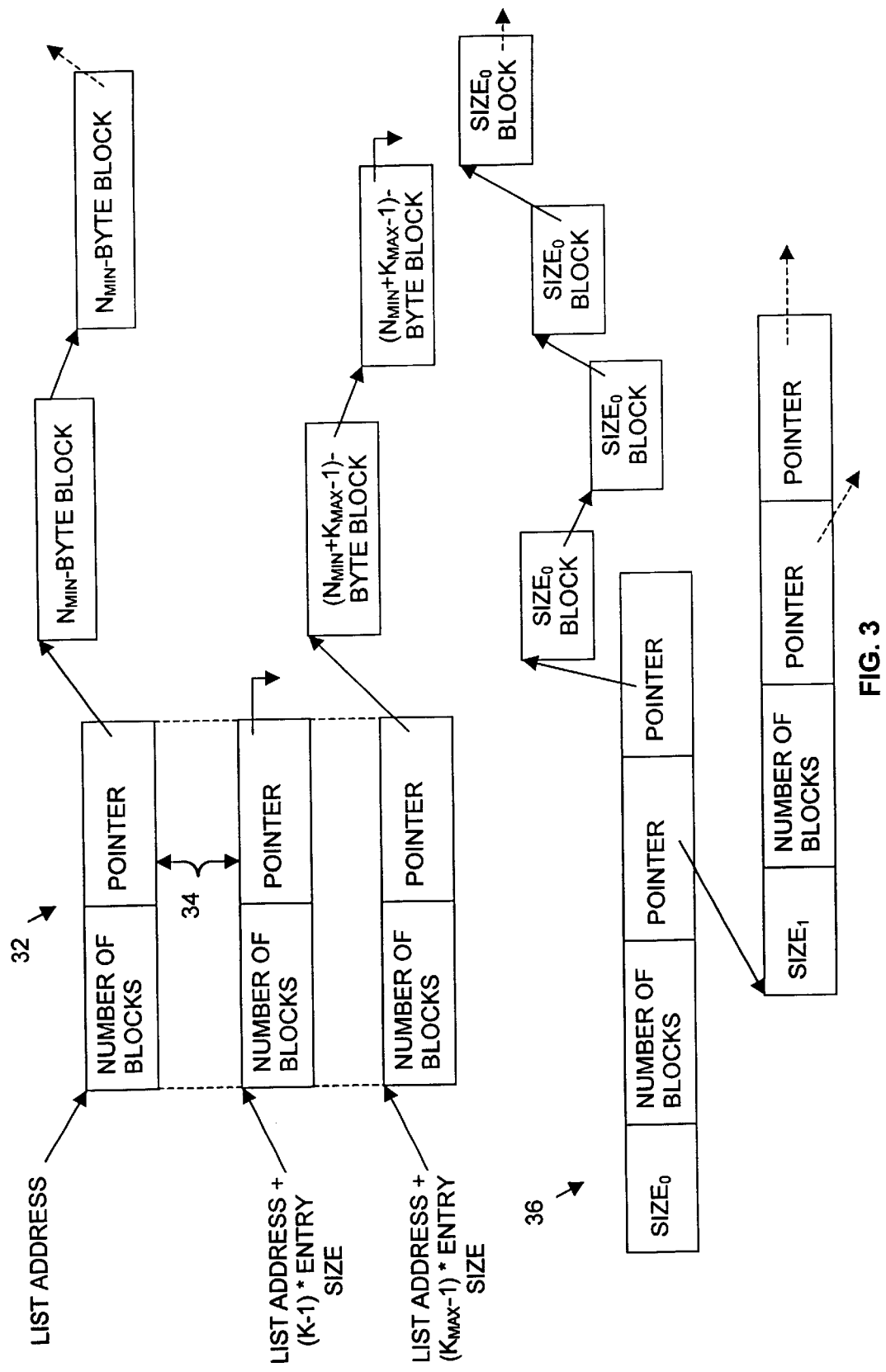
FIG. 3 is a block diagram that illustrates a type of free-block-inventory data structure that can be employed in practicing the present invention.

To implement the present invention's teachings, the allocator will keep track of at least some of the free blocks in accordance with their sizes. The particular manner in which this occurs is not critical to the present invention. For the sake of concreteness, though, FIG. 3 depicts an example free-block-inventory data structure that can be used for this purpose. In this example, that data structure includes an array 32 of entries that include pointers 34 to respective linked lists of free blocks. The members of each such "free list" are blocks whose sizes fall within a range to which the respective entry corresponds. For the sake of simplicity, each range in the illustrated embodiment consists of a single memory-block size, and the size associated with each entry differs from the size associated with the previous entry by the alignment interval that the system imposes on dynamic-memory blocks. This may, for instance, be two computer words, i.e., eight bytes if the allocator is being run in a thirty-two-bit system.

Also for the sake of example, the array 32 is depicted as containing a respective pointer to a list for every possible block size up to some value $K_{MAX}$ of sizes. Since there is an entry for every possible size up to that represented by the $K_{MAX}$th entry, some entries may point to empty lists. For any size larger than the one that the $K_{MAX}$th entry represents, there are only non-empty lists. The inventory data structure includes a linked list 36 of entries that point to such further linked lists.

As will be explained below, the allocator will come to regard some lists as including enough blocks and others as including too few. It may be convenient to segregate the two types of lists instead of having all belong to a common "list of lists," as FIG. 3 suggests. Some embodiments may therefore maintain such a segregation, at least in the case of the large-block lists, for which doing so is particularly convenient.

Each array entry may include fields in addition to the pointer field. For the sake of example, the drawing shows one such field, a "number of blocks" field, which contains a value representing the associated linked list's length. As the pointer-representing arrows extending from the various free blocks suggest by example, the free blocks themselves contain other data that support the list organization.

When a block becomes free, it is added to the list, possibly by being placed at the head of the list but more typically by being so placed as to maintain the linked list's address order. When a block of a given size is to be allocated, it is removed from the list for the corresponding size, typically by being taken from the front of the list.

We digress at this point to note that, although an allocator may use a data structure such as FIG. 3's to help it maintain its free-block inventory, such a data structure will not necessarily list the allocator's entire inventory: it will not necessarily list all the memory blocks that the allocator considers available for allocation. An allocator may occasionally allocate, coalesce, or split a block that it considers available for allocation—i.e., a block that is by definition in its free-block inventory—without ever having placed the block in its free-block-inventory data structure. So an allocator can in reality add or remove memory blocks from its inventory without affecting that data structure.

As was mentioned above, allocation, freeing, and free-block-inventory maintenance can occur at various levels in the software hierarchy. As was also mentioned above, an application may itself maintain a dynamically allocable heap and therefore keep its own free-block inventory. Different inventories may therefore be maintained concurrently for different software levels. The operating system, for instance, may maintain an inventory of physical memory that it can allocate to all processes and also keep respective different inventories of its different processes' virtual memory. An application may keep an inventory of its own in support of its "sub-allocation" of (typically virtual) memory that the operating system has allocated to it.

Use of the present invention's allocation techniques at a given software level may be limited to management of only part of the dynamically allocable memory. It often occurs, for instance, that a garbage-collected system divides the heap that its garbage collector manages into "generations," of which there are usually two, although there may be more (or only one). Newly allocated objects are usually placed in a "young generation." The collector typically collects this generation frequently, since objects tend to have high "infant mortality": recently allocated objects tend to become garbage rapidly, while objects that have "survived" for a long time tend to keep surviving. The (again, typically only one) older generation, which contains long-lived objects, is typically collected much less often. Although the present invention's techniques can be used for all generations, some of the present invention's embodiments may employ them only for, say, the old generation. In such a case, nearly all the allocations that result in memory-block removal from the free-block inventory would be those that occur when an object is "promoted" from the young generation to the old one and therefore relocated from the former's space to the latter's. So the term heap in the discussion below will be understood to refer sometimes to only a single generation within a garbage-collected heap.

It is apparent from the discussion so far that allocation can occur in a wide range of environments. The present invention's teachings, which deal with coalescing, are applicable independently of what the environment is. The invention tends to reduce the overall expense of coalescing. It does this by basing coalescing decisions made during a given program execution on run-time demand monitoring, i.e., on monitoring performed during the same execution to assess the program's demand for dynamic allocation. Basically, the allocator observes how often memory blocks of a given size have been allocated over some previous period, projects from this information how many such blocks will likely be allocated during some future period, and bases its decision about whether to coalesce a memory block of the given size on, say, whether there are already enough objects of that size to meet the projected demand.

Although any period can be selected as the period over which demand is measured, periods for this purpose occur naturally in garbage-collected systems. In a two-generation garbage-collection system, for instance, the interval chosen for demand monitoring and projection may be the longer, "major" garbage-collection cycle, over which the old generation is collected. To assess the demand for memory blocks of a given size, the allocator may subtract the number of such blocks free at the beginning of one major cycle from the corresponding number at the end of the previous major cycle. To make the result more accurate, it is preferable respectively to add to and subtract from that difference the number of "births" and "deaths" of the given-sized memory blocks that resulted from coalescing and splitting during the interval.

Another demand-monitoring approach that may be taken in connection with generational garbage collectors is instead to base the measurement on the relatively short, "minor" collection cycles over which the young generation is collected. Whatever way is employed to derive a demand indicator, that indicator can be used as a basis for the criterion by which to decide whether to perform coalescing, as FIG. 4 illustrates.

Figure 4:
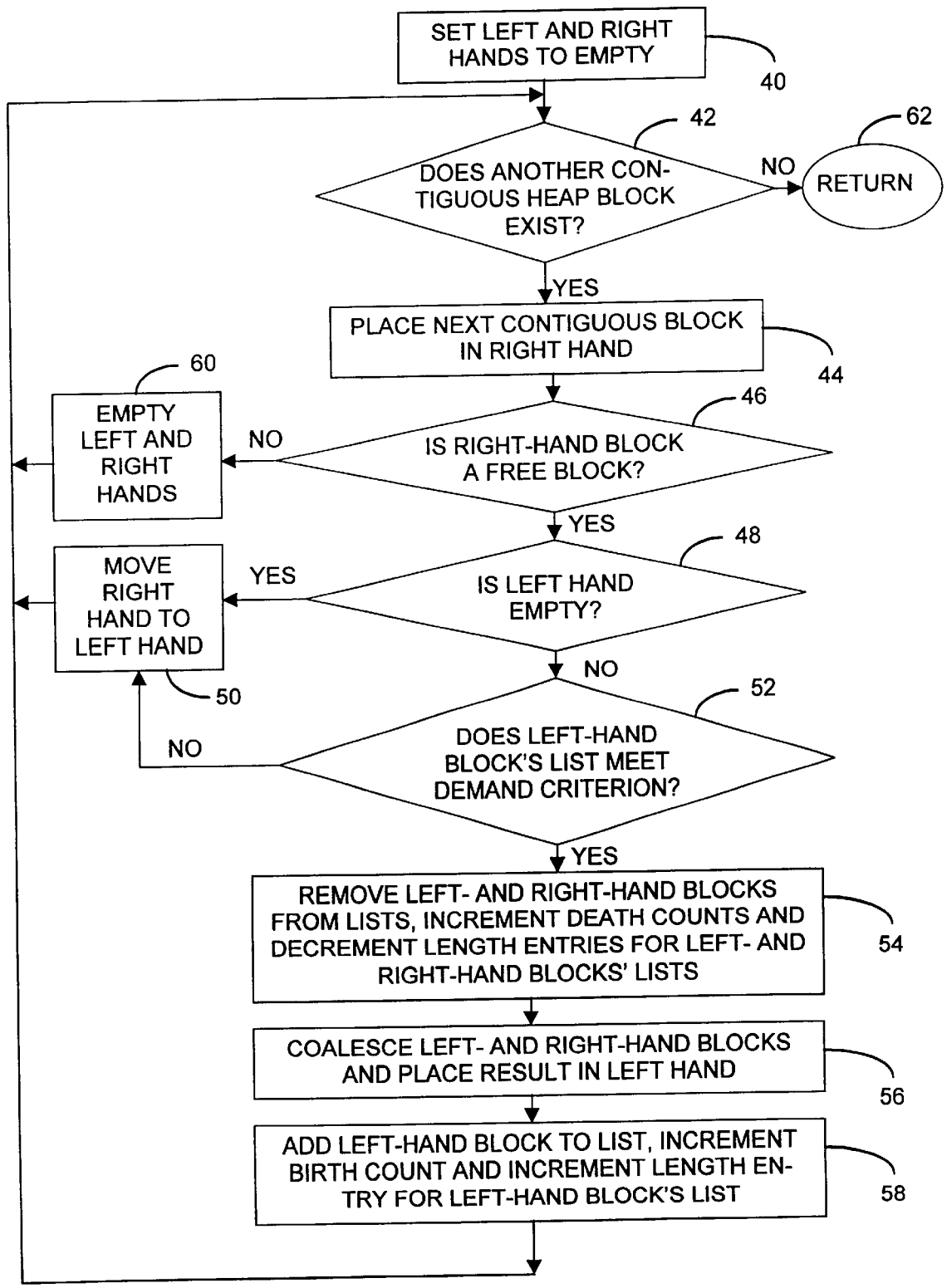
FIG. 4 is a flow chart that illustrates one way in which coalescing decisions can be made in accordance with the present invention.

FIG. 4 depicts an example routine for coalescing free memory blocks. In general, routines for performing coalescing are entered as a result of a memory block's being freed. In a program written in the C programming language, for instance, the triggering event could be one that a free( ) system call's instructions cause. In a mark-sweep garbage collector, a typical event is a sweep operation, which is the collector's identifying unreachable, or "garbage" blocks. A coalescing determination may occur every time such a garbage block is identified. In the alternative, the allocator may delay coalescing until the collector has identified all garbage blocks in a given region. To focus on the coalescing process, FIG. 4 depicts a routine that operates in the latter manner. It starts at the beginning of a generation and traverses in address order (from "left" to "right"), looking for contiguous free blocks to coalesce and coalescing them if demand criteria are met.

To keep track of memory blocks that are candidates for coalescing, that routine employs a couple of pointer-containing variables to which it is conceptually convenient to refer as the "left hand" and the "right hand." When the right- or left-hand pointer identifies a memory block, the right or left hand will be said to "contain" that block. As will be seen shortly, the locations to which the right- and left-hand contents point advance from left to right as the routine proceeds. When they are not empty, the right and left hands tend to contain contiguous blocks, and the presence of free blocks in both hands at the same time signifies the presence of a coalescing candidate.

Block 40 represents the routine's initializing itself by giving the right and left hands' contents to, say, NULL values to indicate that they do not currently contain any memory blocks. The routine then enters a loop that begins with a step, represented by block 42, in which it determines whether any further blocks remain in the left-to-right traversal of the generation. When the routine enters that loop for the first time, the result of block 42's test is always positive, since the routine begins at the generation's left end. So, as block 44 indicates, the first memory block's address is placed in the right hand.

Coalescing cannot occur unless the left and right hands both contain free blocks. If the right hand's block is free but the left hand is empty, coalescing cannot yet occur. The routine therefore continues attempting to find a free-block run: it places the right hand's (free) memory block in the left hand and places the next-rightward memory block in the right hand, as the logic path through blocks 46, 48, 50, and 42 shows. If the block-46 step determines that the new right-hand block is free, the routine has found a free-block run; the block-48 step will this time determine that the left hand is no longer empty, and the block it contains is necessarily free.

Now, the basis on which the illustrated embodiment determines whether to coalesce a run is whether the run's leftmost member belongs to a size list that already has enough members to meet a demand criterion. That criterion may simply be whether the number of blocks in the list exceeds the projected demand or exceeds some predetermined percentage or other function of that projected demand. But the criterion can be designed to enforce other policies, too.

One such policy is that the allocator keep a large block of contiguous free memory at one or the other end of the heap, typically at the high-address, "right" end. To add this policy to the demand criterion, the ratio of the list size to the projected demand that must be exceeded if coalescing is to occur can be made smaller for higher addresses than for lower addresses, for instance, or greater for high address differences between the block to be coalesced and the large terminal block than for lower differences.

Other factors may also enter into the demand criterion. In an object-oriented program, for instance, the criterion can be varied in accordance with the class of the object that previously occupied the newly freed memory block. For some programs, even factors such as the time of day may be useful contributors to determining what the criterion should be.

Although one can delay application of the criterion until after the allocator ascertains a run's total length, the illustrated embodiment instead applies it repeatedly as further blocks in the same run are identified. As FIG. 4's block 52 indicates, the criterion is first evaluated for the leftmost block. If the list does not yet include enough blocks of the leftward block's size to meet the projected demand (or some function thereof, as was explained above), the leftmost block will not be included in a coalescing operation. The left hand's memory block is therefore replaced, as block 50 indicates, with the right hand's memory block. And, as blocks 42 and 44 indicate, the right hand receives the next memory block to the right if there is one and it is free.

Of course, an alternative would be to apply the demand criterion to the right block instead, or require that the sizes of the left and right blocks both be in oversupply, or consider the criterion to be met if either is in oversupply, but we have obtained good results without expending the additional time required to make such determinations. Nonetheless, some embodiments of the present invention may additionally, or instead, employ such a test. Indeed, the demand criterion can be applied additionally, or instead, to the proposed result size, as opposed to the size of one or more constituents. For example, the allocator could first determine the run's total length, determine whether more blocks of that size are needed, and coalesce the whole run only if they are; if they are they are not, some subpart of the run may be coalesced instead.

Note also that some embodiments may employ the demand criterion only in some circumstances but not in all of them. An allocator may depart from a demand criterion in certain circumstances in order to, say, include a bias toward especially large-sized blocks. Such an allocator may coalesce any run greater in length than a predetermined large size, independently of the demand either for blocks of the resultant size or for blocks of the constituents' sizes.

In short, there are many ways to apply the demand criterion. As was mentioned above, though, the illustrated embodiment applies the demand criterion only to the left block. If the demand criterion is met, the allocator proceeds to block 54's step of preparing for the right and left memory blocks' coalescing by removing them from their lists and updating various values that it will use in computing demand. As was explained above, the illustrated embodiment makes a demand measurement by noting the list-length change between garbage-collection cycles and adjusting that change for all births and deaths that coalescing and splitting have caused. The block-54 step supports the demand measurement by decrementing the length values for the lists from which the constituents were removed and incrementing their death counts.

As block 56 indicates, the allocator then performs the actual coalescing, and it places the result in the left hand.

The particular mechanics of the coalescing operation will depend on the heap and inventory-data structure formats to which a particular embodiment of the invention is applied. Ordinarily, memory blocks employed for dynamic allocation include self-identification "overhead" fields, so coalescing will normally include reformatting a plurality of memory blocks into a single memory block having single size and allocation-status fields. For the sake of simplicity, FIG. 4 does not separately present those particular coalescing-operation details. But it does include block 58, which represents updating various data to reflect the result. Specifically, it adds the resultant block to the list associated with its size, and it increments that list's birth count and length entry.

Having now placed a larger free block in the left hand, the allocator again places the next block to the right into the right hand if any blocks are left. By repeatedly executing the loop in the manner just described, the allocator creates an increasingly large left-hand free block by coalescing further blocks with the results of previous coalescing until (1) the block-42 step determines that the end of the heap has been reached, (2) the block-46 step determines that the next, right-hand memory block is not free or (3) the block-52 step determines that there is an inadequate supply of free blocks whose size is that of the left-hand block. In the third case, the allocator proceeds to the block-50 step of, as before, potentially starting a new coalescing candidate at the right-hand block. In the second case, the allocator proceeds to the step of block 60, in which it empties the left and right hands both before proceeding to the block-50 step. In the first case, in which it reaches the end of the heap, on the other hand, the routine simply returns, as block 62 indicates.

The reason why the major garbage-collection cycle was given as an example basis for defining intervals over which to project demand is that many two-generation garbage-collection systems work in a way that makes this choice natural. In many such systems, the major cycle principally involves a methodical sweeping operation in which the collector proceeds linearly through one of the heap's generations, identifying memory blocks that an associated marking operation has not identified as still being "reachable" by the program. Coalescing can be done in the process. Since nearly all of the free-block-inventory replenishment occurs during this major-cycle sweeping and coalescing, it makes sense to project demand over the time that will lapse before the next major cycle, when the free-block inventory can again be replenished.

But some embodiments may not perform the coalescing as part of that sweeping process. That is, all of the sweeping may be performed first, and the coalescing may then be carried out in the background (as the marking and sweeping typically would, too). If the manner in which time is allocated to this background operation is such that the coalescing extends over a significant part of the inter-major-cycle interval, some coalescing decisions may be made relatively near the end of an inter-cycle interval. If so, it does not make sense to base such coalescing decisions on criteria the same as those used when that interval is just beginning. Since the supplies of various-sized free blocks are expected to decline progressively as the time for the next major cycle draws closer, that is, one may prefer that blocks of a given size not be judged to be undersupplied just because, as expected, their number has declined during that interval to a value less than the demand projected for the entire interval. It may therefore be desirable to reassess demand at various times during the inter-major-cycle interval. For example, since minor cycles may occur, say, hundreds of times as frequently as major cycles, such a reassessment could be performed at the end of every minor garbage-collection cycle.

The reassessment can consist simply of prorating the previously projected major-cycle demand over the remaining fraction of the inter-major-cycle interval. That fraction is readily determined from the normal number of minor cycles between major cycles and the number of minor cycles that the above occurred since the last major cycle. The allocator can base splitting decisions on such prorated values. If the number of given-sized free blocks exceeds the prorated demand, for example, the allocator can decide to coalesce blocks of that size even if there are fewer such blocks than an entire inter-major-cycle interval requires.

Actually, the frequency with which demand projections are updated can be as high or low as desired, and the precise demand metric may differ between embodiments. Rather than base updates on minor (or major) cycles, for example, one could update that projection for each block size whenever a certain number of bytes have been allocated since the last update. Such an approach may be preferred, in fact, in systems that employ explicit (e.g., malloc/free) garbage collection rather than systematic, cyclical garbage collection. For instance, one may employ a demand projection that results from a demand calculation such as the following a given block size:

$$d_n = \begin{cases} a_1, & n = 1 \\ d_{n-1}r + a_n(1-r), & n \geq 2, \end{cases} \quad (1)$$

where $d_n$ is the nth demand projection for the given block size, $a_n$ is the number of blocks of the given size that have been allocated since the (n−1)th update, and $0 \leq r \leq 1$ is a decay parameter.

Equation (1) shows that the demand projections when r=0 and r=1 are respectively the most-recent and the first allocation counts, whereas the following expansion of Equation (1) for r>0 shows that the projected demand for all other values of r depends on all periods' allocation counts but responds more quickly to allocation-count changes when r is close to zero than when it is close to one:

$$d_n = \begin{cases} a_1, & n = 1 \\ a_1 r^{n-1} + (1-r)\sum_{k=2}^{n} a_k r^{n-k}, & n \geq 2. \end{cases} \quad (2)$$

Demand-based decisions may be based, as in the illustrated embodiment, solely on the oversupply of only one of the blocks to be coalesced. But they may instead be based on both constituent blocks' oversupply, solely on the undersupply of the resultant block, on some combination of that undersupply with those oversupplies, or on some comparison, such as the relationship between the degree of oversupply and the degree of undersupply.

The present invention can thus be implemented in a wide range of embodiments and therefore constitutes a significant advance in the art.

What is claimed is:

1. For satisfying requests for dynamic allocation of blocks of a computer system's computer memory, a method that includes:
   A) maintaining an inventory of memory blocks available for dynamic allocation;
   B) for each of a plurality of size ranges, deriving a demand indicator by monitoring run-time allocations of memory blocks whose sizes belong to that range;
   C) in response to each of at least one release request that specifies a respective memory block, adding the memory block thereby specified to the inventory, whereby a memory-block run occurs if the release requests specify memory blocks adjacent to memory blocks already in the inventory, and, if such a run occurs:
      i) for each of at least one group of memory blocks within that memory-block run, making a coalescing decision that depends on the value of at least one said demand indicator and the number of inventory memory blocks that are in the size range with which the demand indicator is associated; and
      ii) coalescing that group of memory blocks into a composite memory block only upon a positive outcome of the coalescing decision made for that group; and
   D) in response to each of at least one allocation request, allocating such a composite memory block.

2. A method as defined in claim 1 wherein at least one said demand indicator on whose value the coalescing decision depends is the demand indicator associated with the size range to which the size of one of the memory blocks in the group thereof for which the coalescing decision is being made belongs.

3. A method as defined in claim 2 wherein the only demand indicator on whose value the coalescing decision depends is the demand indicator associated with the size range to which the size of one of the memory blocks in the group thereof for which the coalescing decision is being made belongs.

4. A method as defined in claim 3 wherein the memory block with whose size the demand indicator is associated is the memory block having the lowest address in the group of memory blocks for which the coalescing decision is being made.

5. A method as defined in claim 1 wherein run time is treated as divided into periods, and the demand indicator employed during one period depends on the allocations that occur during the immediately previous period.

6. A method as defined in claim 5 wherein the demand indicator employed during one period additionally depends on the allocations that occur before the immediately previous period.

7. A method as defined in claim 5 wherein at least some of the release requests are made by a garbage collector that operates in garbage-collection cycles, and the periods into which the run time is decided are garbage-collection cycles in which the garbage collector operates.

8. A method as defined in claim 1 wherein the coalescing decision additionally depends on the location of one or more memory blocks in the memory run.

9. A method as defined in claim 1 wherein, for at least one of said size ranges, the derivation of the demand indicator includes determining a difference value equal to the difference between the number of free blocks whose sizes belong to that range at one time and the number of free blocks whose sizes belong to that range at some other time.

10. A method as defined in claim 9 wherein, for at least one of said size ranges, the derivation of the demand indicator includes adjusting the difference value for the numbers of free blocks added and removed from the inventory by coalescing and splitting.

11. A method as defined in claim 1 wherein each of a plurality of the size ranges includes only one block size.

12. A method as defined in claim 1 wherein the coalescing occurs at least sometimes before the allocation request in response to which the resultant composite memory block is allocated.

13. A storage medium containing instructions readable, by a computer system that makes allocation requests, to configure the computer system to operate as an allocator that:
   A) maintains an inventory of memory blocks available for dynamic allocation;
   B) for each of a plurality of size ranges, derives a demand indicator by monitoring run-time allocations of memory blocks whose sizes belong to that range;
   C) in response to each of at least one release request that specifies a respective memory block, adds the memory block thereby specified to the inventory, whereby a memory-block run occurs if the release requests specify memory blocks adjacent to memory blocks already in the inventory, and, if such a run occurs:
      i) for each of at least one group of memory blocks within that memory-block run, makes a coalescing decision that depends on the value of at least one said demand indicator and the number of inventory memory blocks that are in the size range with which the demand indicator is associated; and
      ii) coalesces that group of memory blocks into a composite memory block only upon a positive outcome of the coalescing decision made that group; and
   D) in response to each of at least one allocation request, allocates such a composite memory block.

14. A storage medium as defined in claim 13 wherein at least one said demand indicator on whose value the coalescing decision depends is the demand indicator associated with the size range to which the size of one of the memory blocks in the group thereof for which the coalescing decision is being made belongs.

15. A storage medium as defined in claim 14 wherein the only demand indicator on whose value the coalescing decision depends is the demand indicator associated with the size range to which the size of one of the memory blocks in the group thereof for which the coalescing decision is being made belongs.

16. A storage medium as defined in claim 15 wherein the memory block with whose size the demand indicator is associated is the memory block having the lowest address in the group of memory blocks for which the coalescing decision is being made.

17. A storage medium as defined in claim 13 wherein run time is treated as divided into periods, and the demand indicator employed during one period depends on the allocations that occur during the immediately previous period.

18. A storage medium as defined in claim 17 wherein the demand indicator employed during one period additionally depends on the allocations that occur before the immediately previous period.

19. A storage medium as defined in claim 17 wherein at least some of the release requests are made by a garbage collector that operates in garbage-collection cycles, and the periods into which the run time is decided are garbage-collection cycles in which the garbage collector operates.

20. A storage medium as defined in claim 13 wherein the coalescing decision additionally depends on the location of one or more memory blocks in the memory run.

21. A storage medium as defined in claim 13 wherein, for at least one of said size ranges, the derivation of the demand indicator includes determining a difference value equal to the difference between the number of free blocks whose sizes belong to that range at one time and the number of free blocks whose sizes belong to that range at some other time.

22. A storage medium as defined in claim 21 wherein, for at least one of said size ranges, the derivation of the demand indicator includes adjusting the difference value for the numbers of free blocks added and removed from the inventory by coalescing and splitting.

23. A storage medium as defined in claim 13 wherein each of a plurality of the size ranges includes only one block size.

24. A storage medium as defined in claim 13 wherein the coalescing occurs at east sometimes before the allocation request in response to which the resultant composite memory block is allocated.

25. A computer system that makes allocation requests, includes computer memory, and comprises:
   A) memory locations, included in the computer memory, that contain instructions directing the computer system to maintain an inventory of memory blocks available for dynamic allocation;
   B) memory locations, included in the computer memory, that contain instruction directing the computer system to derived for each of a pluralitity of size range a demand indicator by monitoring run-time allocations of memory blocks whose sizes belong to that range;
   C) memory locations, included in the computer memory, that contain instructions directing the computer system to response respond to each of at least one release request that specifies a respective memory block by adding the memory block thereby specified to the inventory, whereby a memory-block run occurs if the release requests specify memory blocks adjacent to memory blocks already in the inventory, and, if such a run occurs:
      i) making a coalescing decision, for each of at least one group of memory blocks within that memory-block run, that depends on the value of at least one said demand indicator and the number of inventory memory blocks that are in the size range with which the demand indicator is associated; and
      ii) coalescing that group of memory blocks into a composite memory block only upon a positive outcome of the coalescing decision made for that group; and
   D) memory locations, included in the computer memory, that contain instructions directing the computer system to respond to each of at east one allocation request, by allocating such composite memory block.

26. A computer system as defined in claim 25 wherein at least one said demand indicator on whose value the coalescing decision depends is the demand indicator associated with the size range to which the size of one of the memory blocks in the group thereof for which the coalescing decision is being made belongs.

27. A computer system as defined in claim 26 wherein the only demand indicator on whose value the coalescing decision depends is the demand indicator associated with the size range to which the size of one of the memory blocks in the group thereof for which the coalescing decision is being made belongs.

28. A computer system as defined in claim 27 wherein the memory block with whose size the demand indicator is associated is the memory block having the lowest address in the group of memory blocks for which the coalescing decision is being made.

29. A computer system as defined in claim 25 wherein run time is treated as divided into periods, and the demand indicator employed during one period depends on the allocations that occur during the immediately previous period.

30. A computer system as defined in claim 29 wherein the demand indicator employed during one period additionally depends on the allocations that occur before the immediately previous period.

31. A computer system as defined in claim 29 wherein at least some of the release requests are made by a garbage collector that operates in garbage-collection cycles, and the periods into which the run time is decided are garbage-collection cycles in which the garbage collector operates.

32. A computer system as defined in claim 25 wherein the coalescing decision additionally depends on the location of one or more memory blocks in the memory run.

33. A computer system as defined in claim 25 wherein, for at least one of said size ranges, the derivation of the demand indicator includes determining a difference value equal to the difference between the number of free blocks whose sizes belong to that range at one time and the number of free blocks whose sizes belong to that range at some other time.

34. A computer system as defined in claim 33 wherein, for at least one of said size ranges, the derivation of the demand indicator includes adjusting the difference value for the numbers of free blocks added and removed from the inventory by coalescing and splitting.

35. A computer system as defined in claim 25 wherein each of a plurality of the size ranges includes only one block size.

36. A computer system as defined in claim 25 wherein the coalescing occurs at least sometimes before the allocation request in response to which the resultant composite memory block is allocated.

37. A computer signal representing sequences of instructions that, when executed by a computer system, cause it to operate as an allocator that:
   A) maintains an inventory of memory blocks available for dynamic allocation;
   B) for each of a plurality of size ranges, derives a demand indicator by monitoring run-time allocations of memory blocks whose sizes belong to that range;
   C) in response to each of at least one release request that specifies a respective memory block, adds the memory block thereby specified to the inventory, whereby a memory-block run occurs if the release requests specify memory blocks adjacent to memory blocks already in the inventory, and, if such a run occurs:

i) for each of at least one group of memory blocks within that memory-block run, makes a coalescing decision that depends on the value of at least one said demand indicator and the number of inventory memory blocks that are in the size range with which the demand indicator is associated; and ii) coalesces that group of memory blocks into a composite memory block only upon a positive outcome of the coalescing decision made for that ground; and D) in response to each of at least one allocation request, allocates such a composite memory block.

38. A computer signal as defined in claim 37 wherein at least one said demand indicator on whose value the coalescing decision depends is the demand indicator associated with the size range to which the size of one of the memory blocks in the group thereof for which the coalescing decision is being made belongs.

39. A computer signal as defined in claim 38 wherein the only demand indicator on whose value the coalescing decision depends is the demand indicator associated with the size range to which the size of one of the memory blocks in the group thereof for which the coalescing decision is being made belongs.

40. A computer signal as defined in claim 39 wherein the memory block with whose size the demand indicator is associated is the memory block having the lowest address in the group of memory blocks for which the coalescing decision is being made.

41. A computer signal as defined in claim 37 wherein run time is treated as divided into periods, and the demand indicator employed during one period depends on the allocations that occur during the immediately previous period.

42. A computer signal as defined in claim 41 wherein the demand indicator employed during one period additionally depends on the allocations that occur before the immediately previous period.

43. A computer signal as defined in claim 41 wherein at least some of the release requests are made by a garbage collector that operates in garbage-collection cycles, and the periods into which the run time is decided are garbage-collection cycles in which the garbage collector operates.

44. A computer signal as defined in claim 37 wherein the coalescing decision additionally depends on the location of one or more memory blocks in the memory run.

45. A computer signal as defined in claim 37 wherein, for at least one of said size ranges, the derivation of the demand indicator includes determining a difference value equal to the difference between the number of free blocks whose sizes belong to that range at one time and the number of free blocks whose sizes belong to that range at some other time.

46. A computer signal as defined in claim 45 wherein, for at least one of said size ranges, the derivation of the demand indicator includes adjusting the difference value for the numbers of free blocks added and removed from the inventory by coalescing and splitting.

47. A computer signal as defined in claim 37 wherein each of a plurality of the size ranges includes only one block size.

48. A computer signal as defined in claim 37 wherein the coalescing occurs at east sometimes before the allocation request in response to which the resultant composite memory block is allocated.

49. A computer system that makes allocation requests, includes computer memory, and includes:

A) means for maintaining an inventory of memory blocks available for dynamic allocation;

B) means for deriving, for each of a plurality of size ranges, a demand indicator by monitoring run-time allocations of memory blocks whose sizes belong to that range;

C) means for responding to each of at least one release request that specifies a respective memory block by adding the memory block thereby specified to the inventory, whereby a memory-block run occur if the release requests specify memory blocks adjacent to memory blocks already in the inventory, and, if such a run occurs:

ii) for each of at least one group of memory blocks within that memory-block run, making a coalescing decision that depends on the value of at least one said demand indicator and the number of inventory memory blocks that are in the size range with which the demand indicator is associated; and ii) coalescing that group of memory blocks into a composite memory block only upon a positive outcome of the coalescing decision made for that group; and D) means for allocating such a composite memory block in response to each of at least one allocation request.

* * * * *

UNITED STATES PATENT AND TRADEMARK OFFICE
CERTIFICATE OF CORRECTION

PATENT NO. : 6,839,822 B2 Page 1 of 1
APPLICATION NO. : 10/055414
DATED : January 4, 2005
INVENTOR(S) : Knippel et al.

It is certified that error appears in the above-identified patent and that said Letters Patent is hereby corrected as shown below:

Column 12,
Line 41, please add "for" after "made"

Column 13,
Line 39, please change "instruction" to "instructions"
Line 40, please change "derived" to "derive"
Line 40, please change "range" to "ranges"
Line 45, please delete "response"

Column 15,
Line 10, please change "ground" to "group"

Column 16,
Line 16, please change "east" to "least"
Lein 31, please change "occur" to "occurs"

Signed and Sealed this

Twenty-second Day of August, 2006

JON W. DUDAS
*Director of the United States Patent and Trademark Office*